US012656187B2

(12) United States Patent
Roman et al.

(10) Patent No.: US 12,656,187 B2
(45) Date of Patent: Jun. 16, 2026

(54) ADDITIVELY MANUFACTURED DETECTORS

(71) Applicant: Rosemount Aerospace Inc., Burnsville, MN (US)

(72) Inventors: Jamison K. Roman, Elko, MN (US); Jeremiah Schweitzer, Rosemount, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 571 days.

(21) Appl. No.: 18/110,350

(22) Filed: Feb. 15, 2023

(65) Prior Publication Data

US 2024/0272013 A1 Aug. 15, 2024

(51) Int. Cl.
| | |
|---|---|
| *G01K 7/18* | (2006.01) |
| *B33Y 80/00* | (2015.01) |
| *G01K 1/14* | (2021.01) |
| *G01K 13/02* | (2021.01) |

(52) U.S. Cl.
CPC .............. *G01K 7/18* (2013.01); *B33Y 80/00* (2014.12); *G01K 1/14* (2013.01); *G01K 13/028* (2013.01); *Y10S 29/004* (2013.01)

(58) Field of Classification Search
CPC .......... G01K 7/18; G01K 1/14; G01K 13/028
See application file for complete search history.

(56) References Cited

U.S. PATENT DOCUMENTS

| | | | | |
|---|---|---|---|---|
| 5,302,026 A * | 4/1994 | Phillips | ................ | G01K 13/028 |
| | | | | 374/138 |
| 5,653,538 A * | 8/1997 | Phillips | ................. | G01K 13/02 |
| | | | | 374/138 |
| 6,269,320 B1 * | 7/2001 | Otto | ....................... | B64D 15/20 |
| | | | | 702/132 |
| 7,416,329 B2 * | 8/2008 | Severson | ............... | B64D 15/20 |
| | | | | 374/114 |
| 9,664,542 B2 * | 5/2017 | Gordon | ..................... | G01F 1/46 |
| 9,933,290 B1 * | 4/2018 | Wigen | ...................... | G01F 1/44 |
| 10,612,984 B2 * | 4/2020 | Gilb | ..................... | G01K 13/028 |
| 10,955,433 B2 * | 3/2021 | Jacob | ...................... | G01P 5/165 |

(Continued)

FOREIGN PATENT DOCUMENTS

EP          3415923 A     12/2018

OTHER PUBLICATIONS

European Search Report received in EP Application No. 24157967, Jul. 9, 2024, 10 pages.

*Primary Examiner* — Laura Martin
*Assistant Examiner* — Philip L Cotey
(74) *Attorney, Agent, or Firm* — Suiter Swantz IP

(57) ABSTRACT

A detector includes a scoop portion. The scoop portion includes a top surface extending continuously from a forward tip to an aft end, a bottom surface opposite from the top surface, and a receiving portion therebetween. The bottom surface includes an aperture. The top surface includes a detent formed therein opposite from the aperture across the receiving portion. The detent is configured and adapted to receive at least a portion of a sensor. A method includes additively manufacturing a scoop portion and brazing a strut portion to the scoop portion. The scoop portion includes an upper surface, a lower surface, and a receiving portion therebetween.

17 Claims, 4 Drawing Sheets

(56)            References Cited

U.S. PATENT DOCUMENTS

| | | | |
|---|---|---|---|
| 2004/0095984 A1* | 5/2004 | Severson | G08B 19/02 |
| | | | 374/16 |
| 2007/0220984 A1* | 9/2007 | Slagle | G01P 5/16 |
| | | | 374/E13.006 |
| 2008/0218385 A1* | 9/2008 | Cook | G01K 13/02 |
| | | | 374/E13.006 |
| 2010/0206991 A1* | 8/2010 | Severson | G08B 19/02 |
| | | | 244/134 F |
| 2011/0317740 A1* | 12/2011 | Ireland | G01K 13/02 |
| | | | 374/E7.004 |
| 2016/0304210 A1* | 10/2016 | Wentland | B64D 15/12 |
| 2017/0227402 A1* | 8/2017 | Isebrand | B64D 45/00 |
| 2017/0227404 A1* | 8/2017 | Herman | G01K 13/028 |
| 2018/0058951 A1* | 3/2018 | Zinn | G01K 13/028 |
| 2018/0372557 A1* | 12/2018 | Shaughnessy | G01K 13/028 |
| 2018/0372559 A1* | 12/2018 | Parsons | G01K 13/028 |
| 2019/0242923 A1* | 8/2019 | Farokhi | G01P 5/165 |
| 2020/0041352 A1* | 2/2020 | Ashton | G01K 13/02 |
| 2021/0270146 A1* | 9/2021 | Holl | G01K 13/028 |

* cited by examiner

ADDITIVELY MANUFACTURED DETECTORS

BACKGROUND OF THE INVENTION

1. Field of the Invention

The present disclosure relates to detectors, and more particularly to an icing conditions detector (ICD) manufactured using additive manufacturing techniques for consolidation of parts.

2. Description of Related Art

Icing conditions exist when moisture is present and the temperature is cold enough. The presence of liquid in the atmosphere can be detected thermally using an Icing Conditions Detector (ICD) having two Platinum Resistance Thermometers (PRTs). One of these thermometers, the "wet" thermometer, is located in the inlet of a sensor housing and is exposed to entering air and entrained droplets, if present. The other thermometer, the "dry" thermometer, is located in a flow path from which all entrained moisture has been inertially separated, and serves as a dry reference to the first PRT. Heat transfer from the "wet" thermometer in moisture conditions increases from an otherwise identical dry condition, so the power required to heat the thermometer also increases. The ICD is baselined to dry conditions so an increase in power at the "wet" element indicates the presence of moisture. The ICD signals an icing condition if the measured liquid water content and the total air temperature are above or below, respectively, programmed thresholds.

Current ICD utilizes a scoop and flow methodology to achieve the separation of moisture for the reference dry element, which generally utilize several piece parts of the ICD assembly that create brazing and alignment challenges which adds cost to the product. The conventional techniques have been considered satisfactory for their intended purpose. However, there is an ever present need for improved ICD. This disclosure provides a solution for this need.

SUMMARY

In accordance with at least one aspect of this disclosure, a detector includes a scoop portion. The scoop portion includes a top surface extending continuously from a forward tip to an aft end, a bottom surface opposite from the top surface, and a receiving portion therebetween. The bottom surface includes an aperture. The top surface includes a detent formed therein opposite from the aperture across the receiving portion. The detent is configured and adapted to receive at least a portion of a sensor.

In certain embodiments, the scoop portion can be unitarily formed from a single material. The single material can be aluminum or a beryllium copper material.

In certain embodiments, the detector can include a sensor extending into the receiving portion of the scoop portion. The detent can include an inwardly extending surface. The sensor can be received within the detent without touching the inwardly extending surface.

In certain embodiments, the bottom surface of the scoop portion can include holes defined therein. The holes can be configured and adapted for at least one of thermal and flow management. The scoop portion can include a loop for brazing in a wire heater.

In certain embodiments, the detector can further include a strut portion. The strut portion and the scoop portion can be unitarily formed with one another. The strut portion and the scoop portion can be unitarily formed from a single material. The single material can be aluminum or a beryllium copper material.

In certain embodiments, the strut portion can include a strut body a sleeve unitarily formed therewith. The sleeve of the strut portion can be formed from a different material than the strut body. The sleeve of the strut portion can extend outwardly from a top surface of the strut body and can be configured and adapted to isolate heat flow between the strut body and a sensor.

In certain embodiments, the strut portion can include a strut body and a continuous resistive heating portion unitarily formed therewith. The continuous resistive heating portion of the strut portion can be formed from a different material than the strut body. The strut portion can define a longitudinal axis extending from a baseplate to the scoop portion opposite the baseplate. The sensor can include a sensor extending through the strut portion parallel to the longitudinal axis.

In certain embodiments, the detector can include a strut portion brazed to the scoop portion. The strut portion can include a strut body and a sleeve unitarily formed therewith. The sleeve of the strut can be formed from a different material than the strut body. The sleeve of the strut portion can extend outwardly from a top surface of the strut body and can be configured and adapted to isolate heat flow between the strut body and a sensor.

In certain embodiments, the strut portion can include a sleeve unitarily formed therewith. The sleeve of the strut portion can be formed from a different material than the remaining portion of the strut portion. The sleeve of the strut portion can extend outwardly from a top surface of the strut portion and can be configured and adapted to isolate heat flow between the strut portion and a sensor.

In certain embodiments, the strut portion can include a strut body and a continuous resistive heating portion unitarily formed therewith. The continuous resistive heating portion of the strut portion can be formed from a different material than the strut body.

In accordance with at least one aspect of this disclosure, a method includes additively manufacturing a scoop portion and brazing a strut portion to the scoop portion. The scoop portion includes an upper surface, a lower surface, and a receiving portion therebetween.

In accordance with another aspect, a method includes additively manufacturing a scoop portion and strut portion as one part. The scoop portion includes an upper surface, a lower surface, and a receiving portion therebetween.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figures 1, 2A:
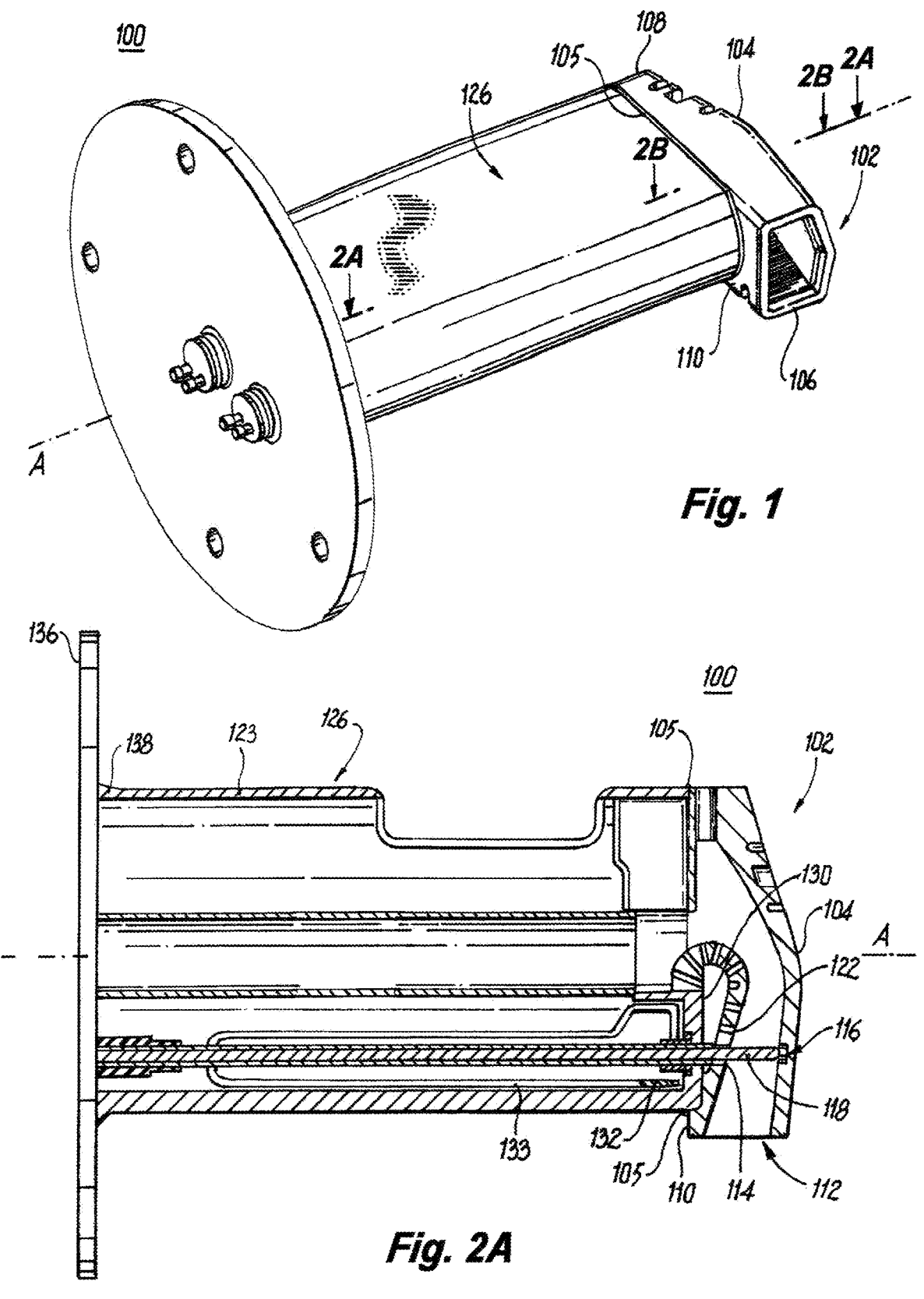
FIG. 1 is a perspective view of an embodiment of a detector constructed in accordance with the present disclosure, showing an integrally formed scoop portion.
FIG. 2A is a cross-sectional view of the detector of FIG. 1, showing the integrally formed scoop portion and an integrally formed strut portion.

Reference will now be made to the drawings wherein like reference numerals identify similar structural features or aspects of the subject disclosure. For purposes of explanation and illustration, and not limitation, a schematic view of an exemplary embodiment of the detector in accordance with the disclosure is shown in FIG. 1 and is designated generally by reference character 100. Other embodiments of the detector in accordance with the disclosure, or aspects thereof, are provided in FIGS. 2A-6 as will be described. The systems and methods described herein can be used to additively manufacture parts of a detector. Additively manufacturing at least a portion of detector 100 allows for less parts, reduced alignment and clearance issues, and reduced assembly steps and time, as brazing operations are reduced (or eliminated).

Figure 2B:
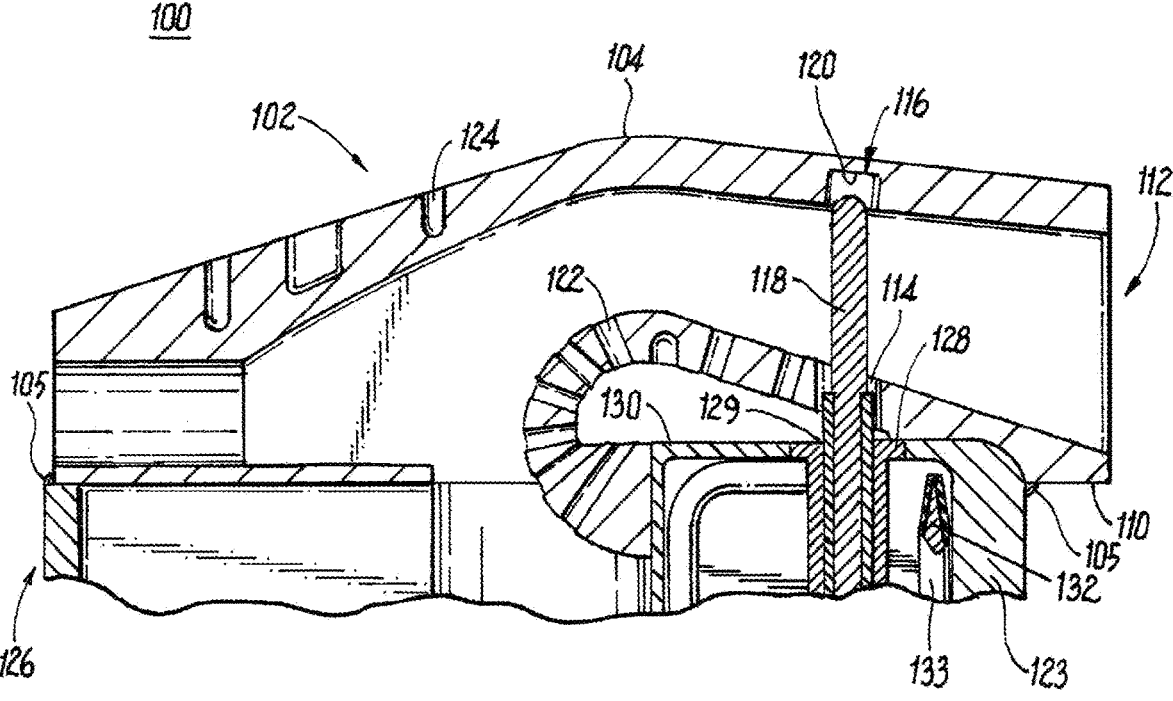
FIG. 2B is an enlarged cross-sectional view of a portion of the embodiment of FIG. 2A, showing the integrally formed scoop portion brazed to the integrally formed strut portion.

As shown in FIGS. 1 and 2A-2B, a detector 100, e.g., an Icing Conditions Detector (ICD), includes a scoop portion 102. The scoop portion 102 includes a top surface 104 extending continuously from a forward tip 106 to an aft end 108. The scoop portion 102 includes a bottom surface 110 opposite from the top surface 104 and a receiving portion 112 between the top surface 104 and the bottom surface 110. The bottom surface 110 includes an aperture 114. The top surface 104 includes a detent 116 formed therein, opposite from the aperture 114 across the receiving portion 112. The detector 100 includes a sensor 118, e.g. a wet element sensor, extending into the receiving portion 112 of the scoop portion 102. The detent 116 is configured and adapted to receive at least a portion of the sensor 118, allowing sensor 118 to get into the receiving portion 112 of the scoop portion 102 without touching it. The very tip of sensor 118 is unheated to alleviate incorrect icing accumulations that may causing incorrect readings. By being received in the detent 116, which is a recessed heated space in the top surface 104 of the scoop 102, the likelihood of the tip of sensor 118 icing up is reduced or prevented. The detent 116 includes a inwardly extending surface 120. While inwardly extending surface 120 is shown relatively linear in nature, those skilled in the art will readily appreciate that the surface 120 could have curvature such as to be a concave surface. The tip of the sensor 118 does not contact the inwardly extending surface 120 of the detent 116. The space between surface 120 and the tip of sensor 118 is meant to be a heated space. Those skilled in the art will readily appreciate that a variety of suitable surface shapes within the detent 116 are contemplated herein. The sensor 118 is received within the detent 116 without touching the surface 120.

With continued reference to FIGS. 1 and 2A-2B, the scoop portion 102 is unitarily formed from a single material by utilizing additive manufacturing techniques. By additively manufacturing the scoop portion 102, among other things, issues with alignment between the aperture 114 and the detent 116 are reduced. Additive manufacturing the scoop portion 102 offers reduced costs and reduced part count as compared with traditional manufacturing methods, such as machining. The single material can be aluminum or a beryllium copper material. Beryllium copper is a preferred material for sensors due to its good strength and thermal properties.

As shown in FIGS. 2A-2B, the bottom surface 110 of the scoop portion 102 includes holes 122 defined therein. The holes 122 are configured and adapted for at least one of thermal and flow management. The scoop portion 102 can include a loop 124 for brazing in a wire heater. The loop 124 can be enclosed or covered with braze after a heater is installed. The detector 100 includes a strut portion 126 brazed to the bottom surface 110 of the scoop portion 102 with a braze material 105. The strut portion 126 includes a strut body 123 and a sleeve 128 unitarily formed with the strut body 123. In the embodiment of FIGS. 1 and 2A-2B, the sleeve 128 of the strut 126 is formed from a different material than the strut body 123 and acts as a thermal isolator sleeve fitted between the strut body 123 and bottom surface 110 of scoop portion 102 for purposes of isolating heat flow between the strut portion 126 and the wet element sensor 118. The strut body 123 is formed with a first material, which is thermally conductive (this can be similar to the material used to form scoop portion 102), while the sleeve 128 of the strut portion 126 is formed from a second material, which is thermally isolating or non-conductive. As an example, the strut portion 126 (including the strut body 123 and sleeve 128) can be unitarily formed using multi-material additive manufacturing, such as selective powder deposition, or the like. The first material (for strut body 123) can be aluminum or a beryllium copper material and the second material (for sleeve 128) can be stainless steel, other similar steel products, or another suitable thermally isolating material.

With continued reference to FIGS. 2A-2B, the sleeve 128 of the strut portion 126 extends outwardly (in a downward direction as oriented in FIG. 2B) from a top surface 130 of the strut body 123 and is configured and adapted to isolate heat flow between the strut body 123 and the sensor 118. The sleeve 128 is formed within an aperture 129. The strut portion 126 defines a longitudinal axis A extending from a baseplate 136 to the scoop portion 102 opposite the baseplate 136. A base 138 of strut body 123 is brazed to baseplate 136. Baseplate 136 can be made from a steel material to reduce heat transfer between the strut portion 126 and a fuselage, or any other internal components. The sensor 118 runs through the strut portion 126 parallel to the longitudinal axis A.

As shown in FIGS. 2A-2B, the strut portion 126 includes a continuous resistive heating portion 132 unitarily formed with the strut body 123 and the sleeve 128. The continuous resistive heating portion 132 extends longitudinally along a leading edge side 131. The continuous resistive heating portion 132 of the strut portion 126 is formed from a third material, different than the materials used for the strut body 126 and the sleeve 128. The third material can be any suitable electrically resistive material. Additionally, an electrically insulating coating 133 made from a fourth material will be unitarily formed with the resistive heating portion 132 as a coating over the resistive heating portion 132 in order to electrically isolate the resistive heating portion 132 from the strut body 123.

Figures 3, 4:
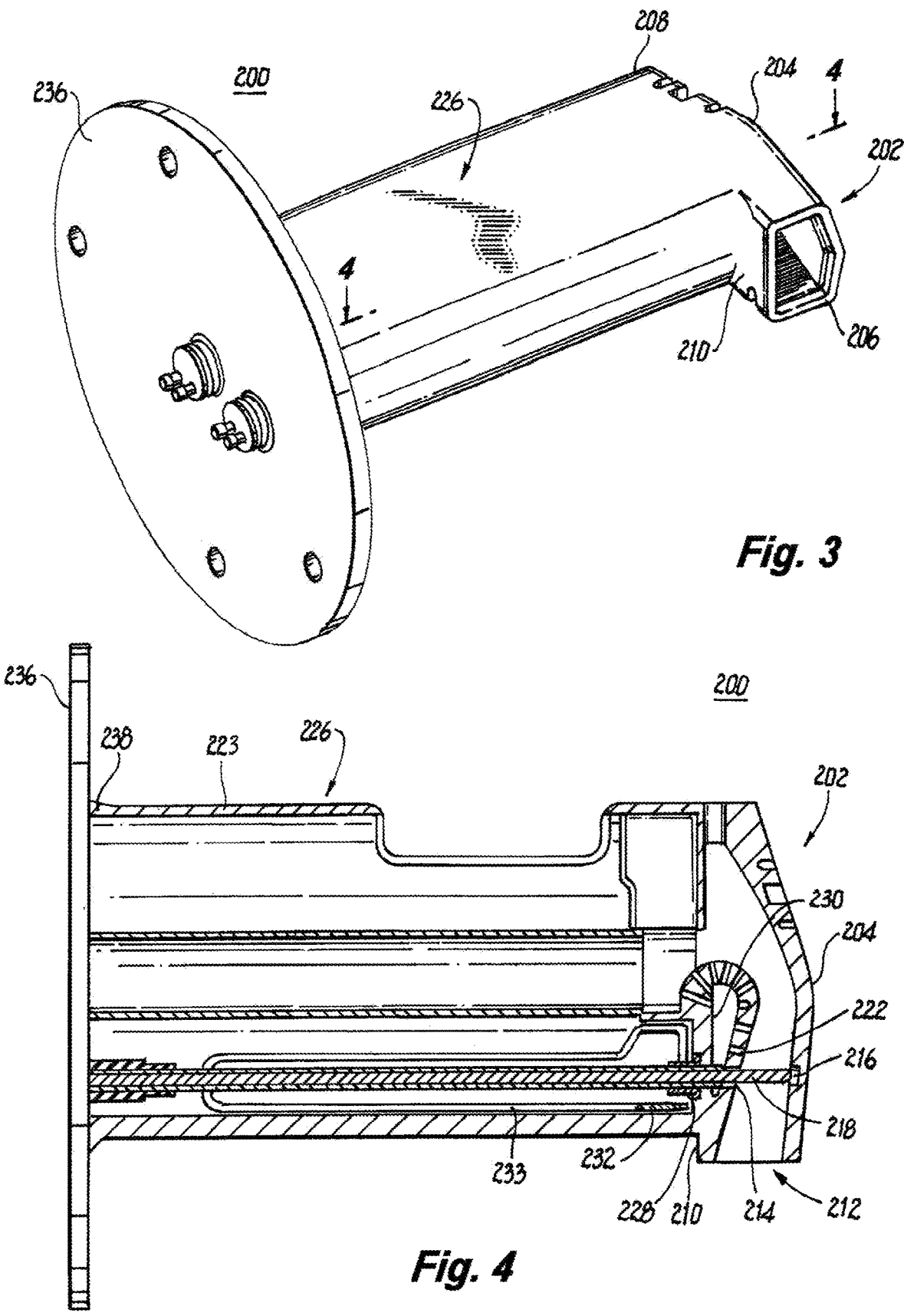
FIG. 3 is a perspective view of another embodiment of a detector constructed in accordance with the present disclosure, showing a scoop portion integrally formed with a strut portion.
FIG. 4 is a cross-sectional view of a portion of the embodiment of FIG. 3, showing the scoop portion integrally formed with the strut portion.

With reference now to FIGS. 3 and 4, another embodiment of a detector 200 is shown. The detector 200 is similar to detector 100, except that in detector 200, a strut portion 226 and a scoop portion 202 are unitarily formed with one another using multi-material additive manufacturing. The scoop portion 202 is similar to the scoop portion 102 in that scoop portion 202 includes a top surface 204 extending continuously from a forward tip 206 to an aft end 208, a bottom surface 210 opposite from the top surface 204, and a receiving portion 212 between the top surface 204 and the bottom surface 210. The bottom surface 210 includes an aperture 214 and also includes holes 222, similar to the aperture 114 and the holes 122. The top surface 204 includes a detent 216 formed therein, similar to detent 116 described above, opposite from the aperture 214 across the receiving portion 212. The strut portion 226 includes strut body 223 and a sleeve 228 unitarily formed therewith. The strut body 223 and the scoop portion 202 are formed with a first material, which is thermally conductive, while the sleeve 228 of the strut portion 226 is formed from a second material, which is thermally isolating or non-conductive. As an example, the scoop portion 202 and the strut portion 226 (including the strut body 223, sleeve 228 and resistive heating portion 232 and coating 233, described below) can be unitarily formed using multi-material additive manufacturing, such as selective powder deposition, or the like. The first material can be aluminum or a beryllium copper material and the second material (for sleeve 228) can be stainless steel, other similar steel products, or another suitable thermally isolating material. Similar to sleeve 128 described above, sleeve 228 of the strut portion 226 extends outwardly from a top surface 230 of the strut body 223 and is configured and adapted to isolate heat flow between the strut body 223 and a sensor 218. Sensor 218 is similar to sensor 118 described above.

With continued reference to FIGS. 3-4, the strut portion 226 includes a continuous resistive heating portion 232 unitarily formed therewith. The continuous resistive heating portion 232 of the strut portion 226 is formed from a third material, different than the materials used for the strut body 223. The third material can be any suitable electrically resistive material. Similar to strut portion 126, strut portion 226 defines a longitudinal axis A extending from a baseplate 236 to the scoop portion 202 opposite the baseplate 236. Additionally, an electrically insulating coating 233 made from a fourth material will be used as a coating over the resistive heating portion 232 in order to electrically isolate the resistive heating portion 232 from the strut body 223. The sensor 218 runs through the strut portion 226 parallel to the longitudinal axis A. A base 238 of strut body 223 is brazed to baseplate 236. Baseplate 236 can be made from a steel material to reduce heat transfer between the strut portion 226 and a fuselage, or any other internal components.

Figures 5, 6:
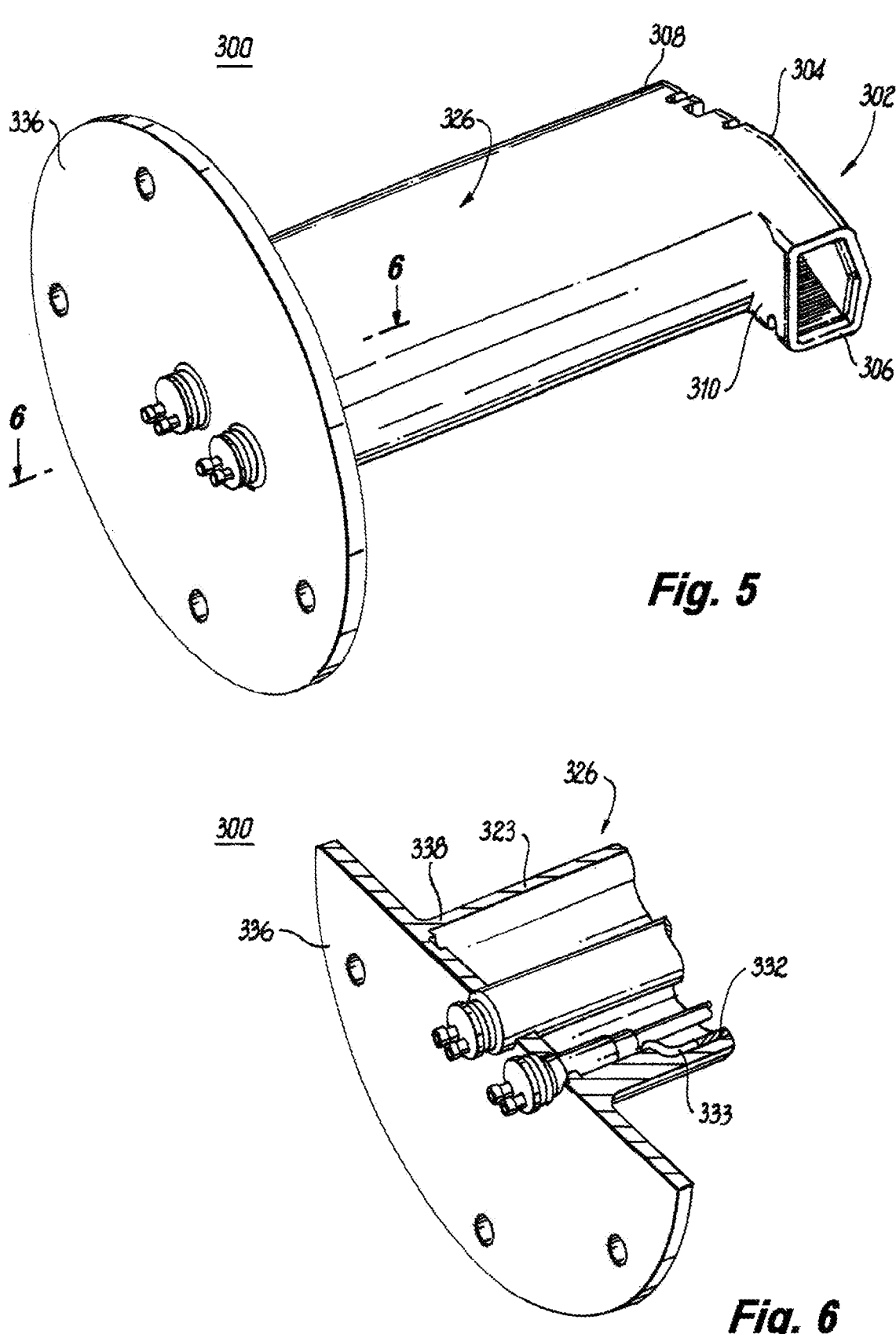
FIG. 5 is a perspective view of another embodiment of a detector constructed in accordance with the present disclosure, showing a scoop portion integrally formed with a strut portion integrally formed with a baseplate.
FIG. 6 is a cross-sectional view of a portion of the embodiment of FIG. 5, showing the strut portion integrally formed with the baseplate.

As shown in FIGS. 5 and 6, another embodiment of a detector 300 includes a scoop portion 302 unitarily formed with a strut portion 326 unitarily formed with a baseplate 336. The detector 300 is similar to detector 200, except that in detector 300, the strut portion 326, scoop portion 302 and baseplate 336 are unitarily formed with one another using multi-material additive manufacturing. The scoop portion 302 is the same as the scoop portion 202. Strut portion 326 is similar to strut portion 226, except that, because the baseplate 336 is unitarily formed along with the scoop portion 302 and the strut portion 326, there is no braze between a base 338 of a strut body 323 and the baseplate 336. The strut portion 326 includes a sleeve 328 unitarily formed therewith. The sleeve 328 is the same as sleeve 228. The strut 326 includes a sensor 318, the same as the sensor 218 described above.

With continued reference to FIGS. 5-6, similar to detector 200, the scoop portion 302 and the strut portion 326 (including the strut body 323, the sleeve 328, a continuous resistive heating portion 332, and a coating 333) are unitarily formed using multi-material additive manufacturing, such as selective powder deposition, or the like. In the embodiment of FIGS. 5-6, at least four different materials can be used in unitarily forming the detector 300. A first material for scoop portion 302 and strut body 323 can be aluminum or a beryllium copper material and a second material (for a sleeve 328, the same as sleeve 228) can be stainless steel, or another suitable thermally isolating material. Similar to detector 200, a continuous resistive heating portion 332 of the strut portion 326 is formed from a third material, which can be any suitable electrically resistive material. Additionally, an electrically insulating coating 333 made from a fourth material will be used as a coating over the resistive heating portion 332 in order to electrically isolate the resistive heating portion 332 from the strut body 323. For forming the baseplate 336, the same stainless steel material used for sleeve 328 can be used.

In accordance with at least one aspect of this disclosure, a method includes additively manufacturing a scoop portion, e.g., scoop portion 102, and brazing a strut portion, e.g., a strut portion 126, to the scoop portion. The scoop portion can include an upper surface, a lower surface, and a receiving portion therebetween.

In another embodiment, a method includes additively manufacturing a scoop portion, e.g., a scoop portion 202, and strut portion, e.g., strut portion 226, as one part.

Current production of detectors, e.g., Icing Conditions Detectors (ICD), is expensive and limited to traditional Electrical Discharge Machining (EDM) and machining techniques. Traditional ICD are comprised of multiple piece parts that are brazed together to form a flow separating scoop in which to install wet and dry PRTs. Multiple parts inherently have more cost, as opposed to less parts. Instead, embodiments of the present disclosure are at least in part manufactured using additive manufacturing and includes less parts. Multiple parts can introduce assembly variations and alignment challenges, which are especially difficult to control with brazing operations. The embodiments of the present disclosure reduce these challenges by using additive manufacturing to form a detector in accordance with the present disclosure.

In addition, the additive manufacturing described herein can resolve clearance issues that are not obtainable by traditional machining processes, provide for fitment improvements and less variation in parts, cut out the need for brazing operations, thereby reducing build time and cost, and optimize the shape of the scoop and fluid flow characteristics. Moreover, utilizing additive manufacturing to rid the need for additional brazing and alignment also reduces product variations in flow properties, and subsequently produces more consistent equipment and calibrations. This improves yields and reduces scrap, which also reduces cost. Using additive manufacturing for parts consolidation can greatly reduce the cost of this product, both in part design, count, and in manufacturing tact time.

The methods and systems of the present disclosure, as described above and shown in the drawings, provide for detectors, such as ICD, with superior properties including increased ease of manufacturing, improved alignment of flow cavities, and reduced cost. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A detector, comprising:

a scoop portion attached to a baseplate including:

a top surface extending continuously from a forward tip to an aft end, wherein the top surface is an element of the scoop portion including a proximal side and distal side from the baseplate;

a bottom surface opposite from the top surface, wherein the bottom surface is an element of the scoop portion including a proximal side and distal side from the baseplate, wherein the bottom surface is closer to the baseplate than the top surface;

a receiving portion therebetween, wherein the bottom surface includes an aperture and wherein the top surface includes a detent formed therein opposite from the aperture in the proximal side of the top surface across the receiving portion, wherein the detent is configured and adapted to receive at least a portion of a sensor; and the sensor extending into the receiving portion of the scoop portion, wherein the detent further includes an inwardly extending surface on a distal side of the detent relative to the baseplate, wherein the sensor is received within the detent and a tip of the sensor is surrounded by the detent, wherein the inwardly extending surface in the detent is not contacted by any body.

2. The detector as recited in claim 1, wherein the scoop portion is unitarily formed from a single material.

3. The detector as recited in claim 2, wherein the single material is aluminum or a beryllium copper material.

4. The detector as recited in claim 1, wherein the bottom surface of the scoop portion further includes holes defined therein configured and adapted for at least one of thermal and flow management.

5. The detector as recited in claim 1, further comprising a strut portion, wherein the strut portion and the scoop portion are unitarily formed with one another.

6. The detector as recited in claim 5, wherein the strut portion and the scoop portion are unitarily formed from a single material.

7. The detector as recited in claim 6, wherein the single material is aluminum or a beryllium copper material.

8. The detector as recited in claim 6, wherein the strut portion defines a longitudinal axis extending from the baseplate to the scoop portion opposite the baseplate.

9. The detector as recited in claim 8, further comprising a sensor extending through the strut portion parallel to the longitudinal axis.

10. The detector as recited in claim 5, wherein the strut portion includes a strut body and a sleeve unitarily formed therewith.

11. The detector as recited in claim 10, wherein the sleeve of the strut portion is formed from a different material than the strut body.

12. The detector as recited in claim 10, wherein the sleeve of the strut portion extends outwardly from a top surface of the strut body and is configured and adapted to isolate heat flow between the strut body and a sensor.

13. The detector as recited in claim 5, wherein the strut portion includes a strut body and a continuous resistive heating portion unitarily formed therewith, wherein the continuous resistive heating portion of the strut portion is formed from a different material than the strut body.

14. The detector as recited in claim 1, further comprising a strut portion brazed to the scoop portion.

15. The detector as recited in claim 14, wherein the strut portion includes a strut body and a sleeve unitarily formed therewith.

16. The detector as recited in claim 15, wherein the sleeve of the strut portion extends outwardly from a top surface of the strut body and is configured and adapted to isolate heat flow between the strut body and a sensor.

17. The detector as recited in claim 14, wherein the strut portion includes a strut body and a continuous resistive heating portion unitarily formed therewith, wherein the continuous resistive heating portion of the strut portion is formed from a different material than the strut body.

*    *    *    *    *